(12) United States Patent
Dower (10) Patent No.: US 10,003,902 B2
(45) Date of Patent: Jun. 19, 2018

(54) SIGNAL MIXING ARCHITECTURE WITH EXTENDED SINGLE-AXIS SPATIALIZATION CONTROL FOR MORE THAN TWO OUTPUTS, SUMMING NODES, OR DESTINATIONS

(71) Applicant: Erik Dower, Gold River, CA (US)

(72) Inventor: Erik Dower, Gold River, CA (US)

( * ) Notice: Subject to any disclaimer, the term of this patent is extended or adjusted under 35 U.S.C. 154(b) by 0 days. days.

(21) Appl. No.: 15/501,948

(22) PCT Filed: Aug. 24, 2015

(86) PCT No.: PCT/US2015/046575
§ 371 (c)(1),
(2) Date: Feb. 6, 2017

(87) PCT Pub. No.: WO2016/032969
PCT Pub. Date: Mar. 3, 2016

(65) Prior Publication Data
US 2017/0245085 A1    Aug. 24, 2017

Related U.S. Application Data

(60) Provisional application No. 62/041,497, filed on Aug. 25, 2014.

(51) Int. Cl.
*H04R 5/00* (2006.01)
*H04S 7/00* (2006.01)
*H04H 60/04* (2008.01)

(52) U.S. Cl.
CPC ............... *H04S 7/30* (2013.01); *H04H 60/04* (2013.01); *H04S 2400/01* (2013.01); *H04S 2400/11* (2013.01)

(58) Field of Classification Search
CPC ..... H04S 7/00; H04S 7/30; H04S 3/00; H04S 2400/01; H04S 2400/03; H04S 2400/05; H04S 2400/13; H04S 5/005; H04S 2400/11; H04R 3/00; H04R 3/04; H04R 3/005; H04R 3/12; H04R 5/00; H04R 5/02; H04R 5/04; H04R 2420/01; H04H 20/89; H04H 60/04
See application file for complete search history.

(56) References Cited

U.S. PATENT DOCUMENTS

| 3,967,063 A | * | 6/1976 | Bauer | ...................... | H04S 3/006 369/89 |
| 3,969,588 A | * | 7/1976 | Raydon | ...................... | H04S 7/30 381/17 |
| 5,917,371 A |  | 6/1999 | Chesarek et al. | | |

(Continued)

OTHER PUBLICATIONS

Toppobrillo Music Electronics, Mixiplexer product website, http://http://www.toppobrillo.com/mixiplexer.html.

(Continued)

*Primary Examiner* — Thang Tran
(74) *Attorney, Agent, or Firm* — Florek & Endres PLLC (57) ABSTRACT

A signal mixing architecture dealing with signal spatialization and distributing signals to more than two destinations that provides a single axis of pan control where a user can move a signal across N-number of channels. Inverse panning and complex pan choreography can be achieved from a simple set of controls in addition to standard mixer functions.

18 Claims, 10 Drawing Sheets

(56) References Cited

U.S. PATENT DOCUMENTS

| | | | | |
|---|---|---|---|---|
| 2003/0174845 A1* | 9/2003 | Hagiwara | ................. | H04S 3/00 381/17 |
| 2006/0251260 A1* | 11/2006 | Kitayama | ............... | H04S 7/302 381/1 |
| 2009/0120264 A1* | 5/2009 | Wheeler | ................. | G10C 1/04 84/174 |
| 2013/0083911 A1 | 4/2013 | Bathurst et al. | | |

OTHER PUBLICATIONS

Toppobrillo Music Electronics, Mixiplexer product manual, http://www.toppobrillo.com/Mixi/Mixiplexer_Manual.pdf.

International Search Report in PCT/US2015/046575 (dated Dec. 9, 2015).

Written Opinion of the International Searching Authority in PCT/US2015/046575 (dated Dec. 9, 2015).

\* cited by examiner

SIGNAL MIXING ARCHITECTURE WITH EXTENDED SINGLE-AXIS SPATIALIZATION CONTROL FOR MORE THAN TWO OUTPUTS, SUMMING NODES, OR DESTINATIONS

REFERENCE TO RELATED APPLICATIONS

This application claims the benefit of U.S. Provisional Application No. 62/041,497, filed Aug. 25, 2014, the disclosure of which is hereby incorporated by reference in its entirety.

BACKGROUND OF THE INVENTION

When we hear a sound we can often determine where the sound is coming from. This is called localization. The process of placing a sound in a sound field (space) is called spatialization. In the production of audio programs, most modern mixers have a 2-channel mixed output where one speaker is positioned to the left of the listener and the other is positioned to the right, i.e., a stereophonic configuration. Another configuration is quadraphonic, in which there are four speakers surrounding the listener in a rectangular configuration, i.e., left front, left rear, right front, right rear. As used herein, the term "quadraphonic" generally represents any number of channels more than 2 (stereophonic).

For spatialization, early mixers offered simple signal routing switches where the user could manually select which speaker(s) the signal would be present in. Subsequent developments resulted in the ability to move a sound smoothly within the spatial sound field (between speakers), which is called panning. In a typical stereo mixer, panning is accomplished with a single-axis rotary potentiometer. For quadraphonic mixing, panning has been accomplished with: (1) a set of 4 potentiometers where each potentiometer corresponds to one of 4 speakers and controls the level of a channel in each speaker; (2) a two-axis X/Y controller such as a joystick or touchscreen where the position of a single point on a grid defines the location of the sound; or (3) a combination of two rotary controls, one for controlling front/back movement of the sound and the other for controlling left/right.

Due to size and expense, quadraphonic mixing hardware was considered bulky and inefficient for pan control of more than one channel, and prior art mixers were thus limited to only one panner per mixer. The result is that only one channel can be panned at a time with conventional quadraphonic mixing hardware, making real-time panning of more than one sound impossible and requiring productions with animated panning of more than one sound to need regular reconfiguration of the system. Therefore, most quadraphonic mixing is accomplished with software on a computer, though still with two-axis pan controls. Automating two-axis pan controls requires two channels of automation, one for each axis, and are thus more difficult and complicated to use.

SUMMARY OF THE INVENTION

The present invention relates to a signal mixing architecture that removes the above limitations of traditional quadraphonic mixing by providing a novel pan control scheme for a mixer. An embodiment of the present invention is directed toward a sound mixing architecture having one or more channels and three or more signal outputs, wherein each channel has a signal input capable of receiving a signal and a single-axis pan control, and wherein the signal of each channel is distributed among the signal outputs according to the position of the single-axis pan control. Another embodiment of the present invention is directed to a sound mixing architecture comprising one or more channels and three or more signal outputs, wherein each channel has a signal input capable of receiving a signal, a single-axis pan control and a plurality of voltage controlled amplifiers, and wherein the signal of each channel is distributed among the voltage controlled amplifiers according to the position of the single-axis pan control. In a further embodiment, the single-axis pan control of each channel employs a potentiometer having a variable resistance, wherein the position of the pan control determines the resistance of the potentiometer, and wherein the resistance of the potentiometer determines the distribution of the signal among the voltage controlled amplifiers and/or signal outputs.

The architecture uses one single-axis pan control with 360° of control instead of a two-axis control, such as a joystick or X/Y touchscreen, or two single-axis controls. The single-axis pan control architecture means hardware implementations can use more standard parts such as rotary potentiometers, slide potentiometers, or rotary encoders instead of joysticks. It also simplifies automation to require only one control signal, thus reducing the required processing power for software, number of parts for hardware, and complexity of interface for either. This also benefits the user by requiring them only to think about the pan control signal in one dimension instead of two. As most controls in music systems generate a single control signal, the single-axis control architecture is also more easily mapped to already available signal sources, as opposed to a two-axis control architecture which requires two coordinated control signals.

The sound mixing architecture of the present invention not only improves upon quadraphonic pan control, but also includes new and novel concepts and features. Normally panning starts with sound in one speaker and is then concerned with positioning that sound in the sound field. One aspect of the present invention offers the inverse, whereby sound exists in all speakers and the panning is concerned with positioning a null region. In other words, the user may move a single point where the sound is not present. Thus, an embodiment of the present invention is directed toward a sound mixing architecture having one or more channels and three or more signal outputs, wherein each channel has a signal input capable of receiving a signal, a single-axis pan control, and a control that outputs a signal inverse to the signal received in the signal input, wherein the inverse signal is distributed equally among the three or more signal outputs, and wherein the signal is distributed among the three or more signal outputs according to the position of the pan control. Thus, a null, i.e., silent, region will be created in the signal output(s) where the signal and the inverted signal are both present An aspect of the present invention also provides the user with the ability to smoothly transition between regular panning and null panning. This is particularly suited to complicated spatial mixing operations requiring many components be moved about in space. It creates empty space where one sound can be placed without overlapping another sound in that region.

Another embodiment of the present invention provides for a master pan automation channel where a single automation control signal can animate the pan position of every channel. Synchronous movements can be scaled and inverted for each channel, allowing complex scenes of automated panning to be defined without the user needing to manually perform or program the maneuvers for every channel. This is particularly useful in working with film productions where a quadraphonic mix is in place and then the camera cuts or rotates to a different angle. To follow the camera angle change, the operator no longer needs to automate two parameters for every channel. Instead, they can automate a single master pan control.

An embodiment of the present invention is also directed to a method of panning sound among three or more sound outputs in a mixing architecture having one or more channels having the steps of: a) inputting a signal into a channel of a mixer; b) receiving the input signal into circuitry controlled by a potentiometer having variable resistance; c) distributing the signal exiting the circuitry controlled by the potentiometer among a plurality of voltage controlled amplifiers based on the resistance of the potentiometer, i.e., the specific distribution among the voltage controlled amplifiers is determined by the resistance of the potentiometer as discussed below and the distribution corresponds to the location(s) in the sound field where sound is desired; d) receiving the signal exiting each of the plurality of voltage controlled amplifiers into a plurality of signal summing stages; and e) outputting the signal exiting each of the plurality of signal summing stages.

In an embodiment of the invention, each of the signal summing stages corresponds to one of a plurality of signal outputs. However, the mixing architecture of the present invention does not require corresponding outputs for each signal summing stage. For example, if the mixing architecture was embedded in a larger system, each summing stage could go to a different signal processor, each of which might later be summed together to have only one output where the signal exits the mixing architecture.

DETAILED DESCRIPTION OF THE INVENTION

Figure 1:
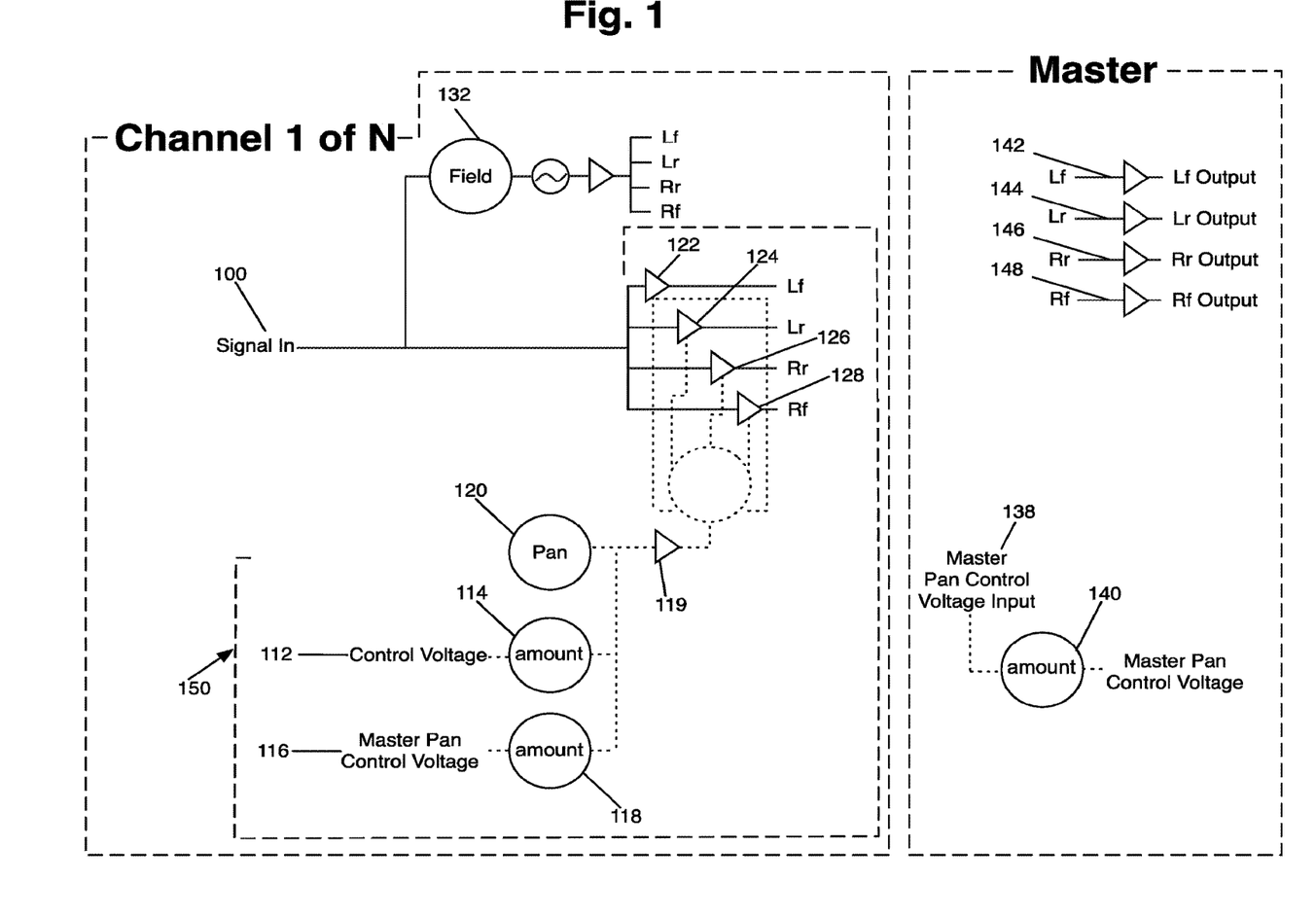
FIG. 1 is the simplified signal flow of a mixer according to an embodiment of the present invention.

FIG. 1 uses function blocks to visualize a simplified signal flow of a mixing architecture in accordance with the present invention having the following components:
100. Signal Input
112. Pan Control Voltage Input
114. Pan Control Voltage Inverting/Non-Inverting Attenuator
116. Master Pan Control Voltage
118. Channel Master Pan Control Voltage Inverting/Non-Inverting Attenuator
119. Pan Control Summing Stage
120. Manual Pan Control
122. Channel Voltage Controlled Amplifier ("VCA") Left Front ("Lf")
124. Channel VCA Left Rear ("Lr")
126. Channel VCA Right Rear ("Rr")
128. Channel VCA Right Front ("Rf")
132. Field Control
138. Master Pan Control Voltage Input
140. Master section Master Pan Control Voltage Inverting/Non-Inverting Attenuator
142. Lf Output Summing Stage
144. Lr Output Summing Stage
146. Rr Output Summing Stage
148. Rf Output Summing Stage
150. Panner The left side of FIG. 1 shows the signal flow of a single channel, though embodiments of the present invention may have more than one channel as the application requires. For example, a mixer in accordance with the present invention may have 1, 2, 3 4, 5, 6, 8, 16, 24 or 32 channels, however, any number of channels is contemplated by the present invention. Each channel contains a Field Control (132) and a Panner (150). Embodiments of the present invention may have additional controls common to mixing consoles such as gain, equalization, volume, solo and mute. The right side of FIG. 1 shows the master section where the signal output of all channels are summed together and output, preferably to speakers, and where the master pan automation controls are located.

In each channel the Signal In (100) goes to four Channel VCAs (122, 124, 126, 128) corresponding to the Lf, Lr, Rr and Rf locations in the sound field, each of which outputs to their respective Output Summing Stage (142, 144, 146, 148), i.e., summing busses, again corresponding to the Lf, Lr, Rr and Rf locations in the sound field. In an embodiment of the invention, each Output Summing Stage (142, 144, 146, 148) has a corresponding Channel VCA (122, 124, 126, 128) in each channel. Thus, for example, in embodiments having 8 output summing stages, 8 corresponding channel VCAs in each channel will also be present. However, it is also envisioned that fewer channel VCAs than the amount of output summing stages may also be employed in embodiments of the present invention.

In an embodiment, automation is achieved through the use of voltage control inputs. In each channel, a Manual Pan Control (120) adds with Pan Control Voltage Input (112) and Master Pan Control Voltage (116). This summed voltage smoothly raises and lowers the gain of each Channel VCA (122, 124, 126, 128) so the Signal In (100) smoothly moves from the first Channel VCA (122) through all other Channel VCAs (124, 126, 128) and back to the first Channel VCA (122). Channel VCA (122) is fully on, i.e., receives 100% of the Signal In (100), with Pan Control (120) at 0% (i.e., the leftmost or bottommost position of the control, which is conventionally the 7 o'clock position in the case of a rotary potentiometer or rotary encoders), and Channel VCA (124) is fully on with Pan Control (120) at 25%. Values between 0% and 25% split the Signal In (100) proportionally between Channel VCA (122) and Channel VCA (124). Thus, for example, if Pan Control (120) is at 12.5%, Channel VCA (122) and Channel VCA (124) would each be half on, i.e., receiving 50% of the Signal In (100). Channel VCA (126) is fully on with Pan Control (120) at 50%, with values between 25% and 50% splitting the Signal In (100) proportionally between Channel VCA (124) and Channel VCA (126) as discussed above. Channel VCA (128) is fully on with Pan Control (120) at 75%, with values between 50% and 75% splitting the Signal in (100) proportionally between Channel VCA (126) and Channel VCA (128) as discussed above, and Channel VCA (122) is also fully on with the Pan Control (120) at 100%, with values between 75% and 100% splitting the Signal In (100) proportionally between Channel VCA (128) and Channel VCA (122) as discussed above.

Therefore, Channel VCAs (122, 124, 126, 128) function so that when any one is at unity gain, all others are silent. In other words, as each output incrementally comes on, i.e., receives increasingly more of the Signal In (100), the previously active output is incrementally turned off, i.e., receives increasingly less of the Signal In (100).

It should be understood, for example, that Channel VCA (122) and Output Summing Stage (142) need not necessarily correspond to Lf in the sound field as shown in FIG. 1. Rather, each Channel VCA (122, 124, 126, 128) and respective Output Summing Stage (142, 144, 146, 148) may correspond to any position in the sound field so as to facilitate intuitive controls for a user. Thus, in an alternative embodiment of the present invention, Channel VCA (122) and Output Summing Stage (142) output to Lf; Channel VCA (124) and Output Summing Stage (144) output to Rf; Channel VCA (126) and Output Summing Stage (146) output to Rr; and Channel VCA (128) and Output Summing Stage (148) output to Lr. Other possible combinations could be easily determined by a person skilled in the art. Regardless of the starting point in the sound field, it is preferred that each sequential Channel VCA and respective Output Summing Stage refer to sequential locations in the sound field and move in either a clockwise or counterclockwise direction around the sound field.

In an embodiment of the present invention, when the sum of Pan Control Voltage Input (112), Master Pan Control Voltage (116) and Manual Pan Control (120) exceeds the maximum allowable voltage (for example, 100%), wrapping of this summed voltage may occur (not shown in FIG. 1). Wrapping subtracts the maximum allowable voltage from the Pan Control Summing Stage (119) so the effect is smooth panning up to 720°. This allows the user to set any manual pan position and still achieve 360° of automated rotation in either direction.

As shown in FIG. 1, Signal In (100) also passes through Field Control (132), which manually controls the gain and inverts the polarity of the signal. Field Control (132) may also be automated in a similar manner as Panner (150), as would be apparent to one skilled in the art, although it is not illustrated in FIG. 1. After exiting Field Control (132), the signal then sums with the output of Channel VCAs (122, 124, 126, 128) at the Output Summing Stages (142, 144, 146, 148). This results in the signal that exited the Field Control (132) being present in all Output Summing Stages (142, 144, 146, 148). However its inverted relationship to the signal controlled by Manual Pan Control (120) means that the signal from the Field Control (132) will null the panned signal when summed by the Output Summing Stages (142, 144, 146, 148) where the panned signal is present. This null effect creates a silent space in the sound field that moves with the panned signal controlled by Manual Pan Control (120). Pan Control Voltage Input (112) and Master Pan Control Voltage (116) automate the pan position settings for each channel. Pan Control Voltage Inverting/Non-Inverting Attenuator (114) optionally attenuates and/or inverts the Pan Control Voltage Input (112) before the Pan Control Summing Stage (119) and Channel Master Pan Control Voltage Inverting/Non-Inverting Attenuator (118) optionally attenuates and/or inverts the Master Pan Control Voltage (116) before the Pan Control Summing Stage (119). Channel Master Pan Control Voltage Inverting/Non-Inverting Attenuator (118) only affects the Master Pan Control Voltage (116) on a particular channel. As would be readily apparent to a person skilled in the art, automation also requires the use of an onboard or external signal source such as an oscillator, microphone or computer where automation data such as position settings can be written and played back.

The master section of the mixer contains a Master Pan Control Voltage Input (138) that routes to the Panner (150) of every channel. Master Section Master Pan Control Voltage Inverting/Non-Inverting Attenuator (140) optionally attenuates and/or inverts Master Pan Control Voltage Input (138), and routes to the Pan Control Summing Stage (119) at every channel. Thus, the signal can be further attenuated and/or inverted at each channel by Channel Master Pan Control Voltage Inverting/Non-Inverting Attenuator (118). The master section also contains Output Summing Stages (142, 144, 146, 148), which sum the signals of all channels on the mixer and output the summed signals to an output device, such as a speaker. A Manual Master Volume Control (134) may also be implemented in the master section of the mixer to control the gain of all Output Summing Stages (142, 144, 146, 148).

Figure 2:
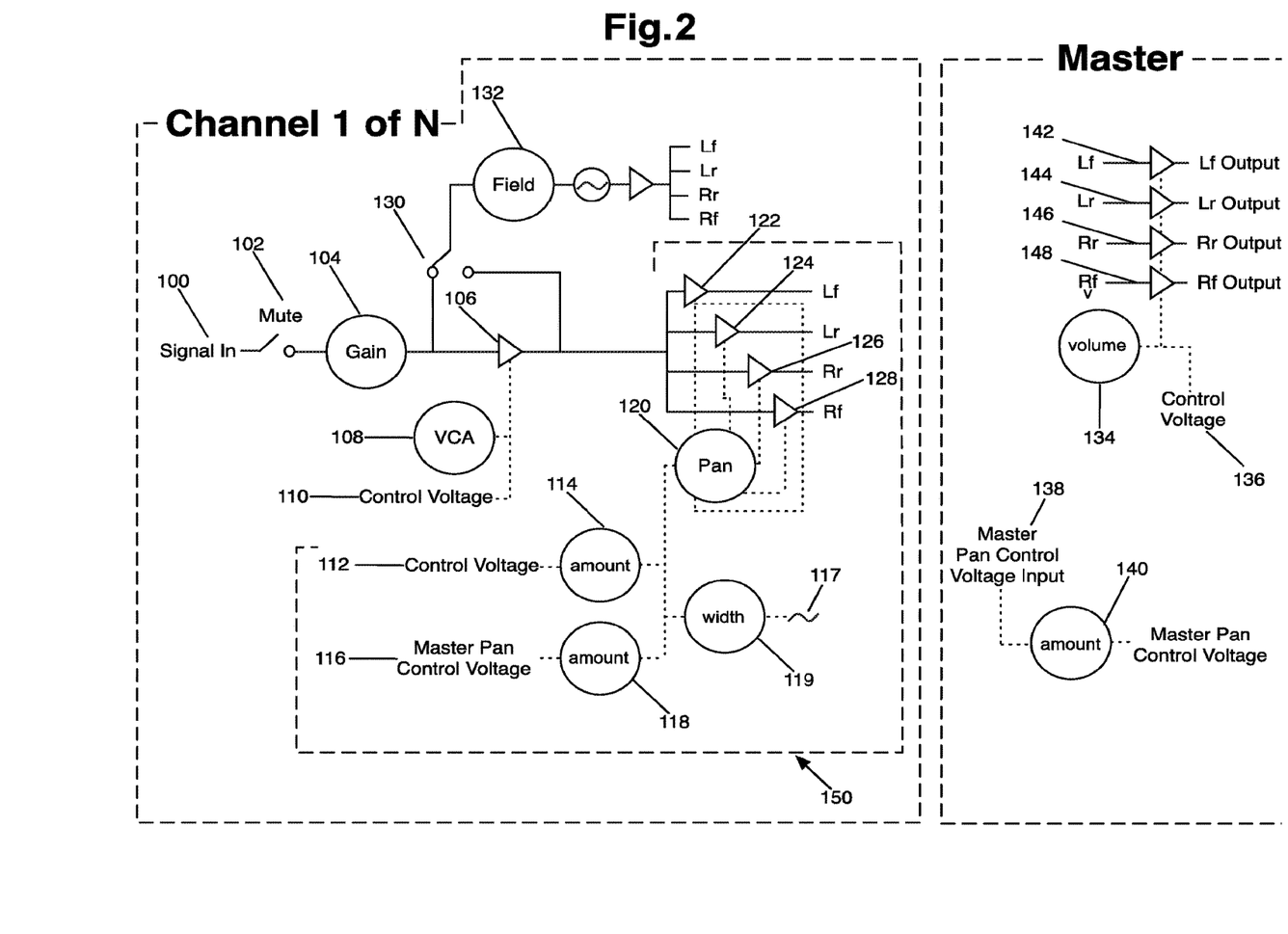
FIG. 2 depicts the simplified signal flow of a mixer of FIG. 1 in the context of a more robust mixing architecture.

FIG. 2 is a more detailed view of a signal flow in accordance with the present invention that incorporates the simplified signal flow of FIG. 1 and has the following additional components:
102. Mute Switch
104. Manual Gain Control
106. VCA
108. VCA Manual Control
110. VCA Control Voltage Input
117. Width Control Voltage Input
130. Field Pre/Post VCA Switch
134. Manual Master Volume Control
136. Master Volume Control Voltage Input
151. Manual Width Control Briefly, as seen in FIG. 2, the Signal Input (100) at each channel goes into a Mute Switch (102) followed by a Manual Gain Control (104). From there VCA (106) dynamically controls the gain. The signal then goes to Channel VCA's (122, 124, 126, 128), each of which outputs to their respective Output Summing Stages (142, 144, 146, 148). A VCA Manual Control (108) adds to a VCA Control Voltage Input (110) and sets the level of VCA (106). After the Mute Switch (102) the signal also goes through a Field Control (132). This manually controls the gain and inverts the polarity. The signal then sums at the Output Summing Stages (142, 144, 146, 148).

Manual Width Control (151) adjusts the gain of an ultrasonic oscillator that modulates the Manual Pan Control (120) to define how many panoramic degrees a sound occupies.

Figure 3:
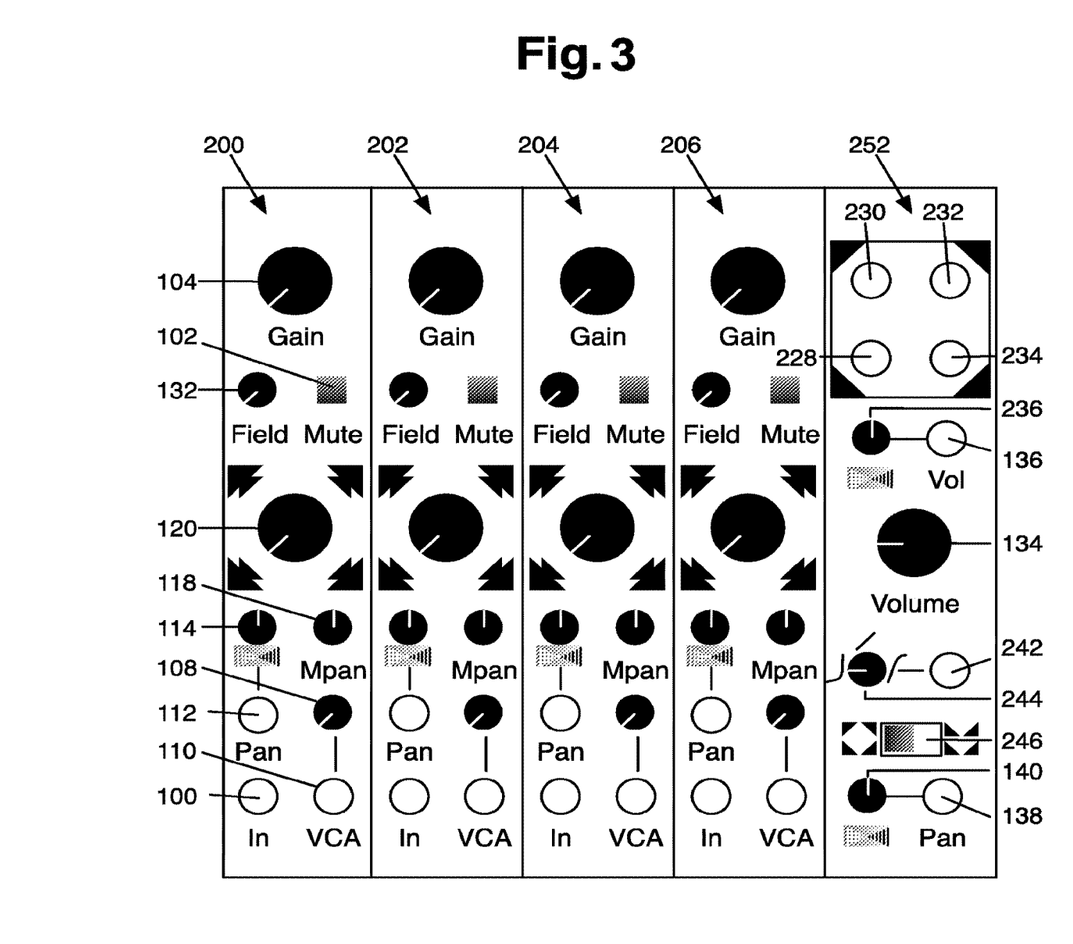
FIG. 3 is a mixer panel interface for a modular synthesizer system of an embodiment of the present invention.

FIG. 3 is an embodiment of one possible interface panel for a modular synthesizer system that employs the signal flow shown by FIG. 1 or FIG. 2 and having the following additional components:
200. Channel 1
202. Channel 2
204. Channel 3
206. Channel 4
228. Lf Output Jack
230. Lr Output Jack
232. Rr Output Jack 234. Rf Output Jack
236. Master Volume Control Voltage Inverting/Non-Inverting Attenuator
242. Slope Control Voltage Input
244. Slope Manual Control
246. Stereo/Quadraphonic Operating Mode Switch
252. Master Section Channels (200, 202, 204, 206) are identical in function. As noted above, it should be understood that embodiments employing more or less than 4 channels may also be practiced in accordance with the teachings herein. On the right is a Master Section (252) through which the signal from all channels flow. Output Jack (228) outputs the signals mixed on the Lf bus, i.e., the signals summed at Output Summing Stage 142. Output Jack (230) outputs the signals mixed on the Lr bus, i.e., the signals summed at Output Summing Stage 144. Output Jack (232) outputs the signals mixed on the Rr bus, i.e., the signals summed at Output Summing Stage 146. Output Jack (234) outputs the signals mixed on the Rf bus, i.e., the signals summed at Output Summing Stage 148.

Slope Control Voltage Input (242) sums with Slope Manual Control (244) to define the slope or curve of the panning trajectory of all channels. This control smoothly changes the slope from a slow rising curve at 0%, to linear curve at 50%, to a fast rising curve at 100%.

Stereo/Quadraphonic Operating Mode Switch (246) switches the mixer into a stereophonic mode of operation. In this mode:
1. Manual Pan Control (120) scales to operate across two channels.
2. Signals pan between Output Jack (228) and Output Jack (234)
3. The signal at Output Jack (228) is also present at Output Jack (230)
4. The signal at Output Jack (234) is also present at Output Jack (232)
5. Field Control (132) functions the same as in quadraphonic mode, however in stereophonic mode it inverts the location of the panned signal.

Figure 4:
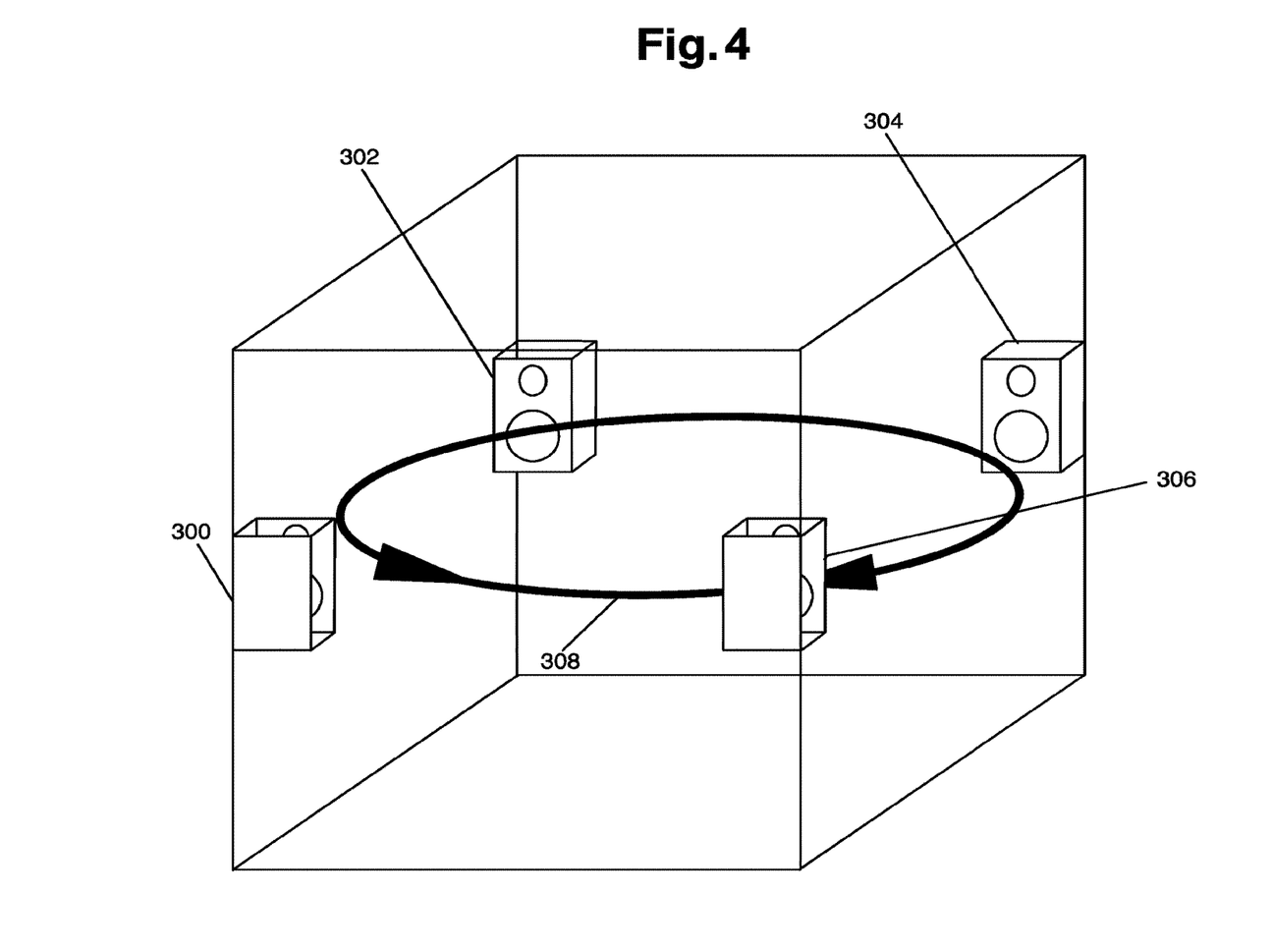
FIG. 4 is a quadraphonic speaker arrangement with single-axis pan trajectory.

FIG. 4 is a quadraphonic panner embodiment with visualized panning path. Path (308) shows the 360° of rotation provided by a single-axis of pan control. Signals summed at Lf Output Summing Stage (142) are heard on speaker (300). Signals summed at Lr Output Summing Stage (144) are heard on speaker (302). Signals summed at Rr Output Summing Stage (146) are heard on speaker (304). Signals summed at Rf Output Summing Stage (148) are heard on speaker (306).

Figure 5:
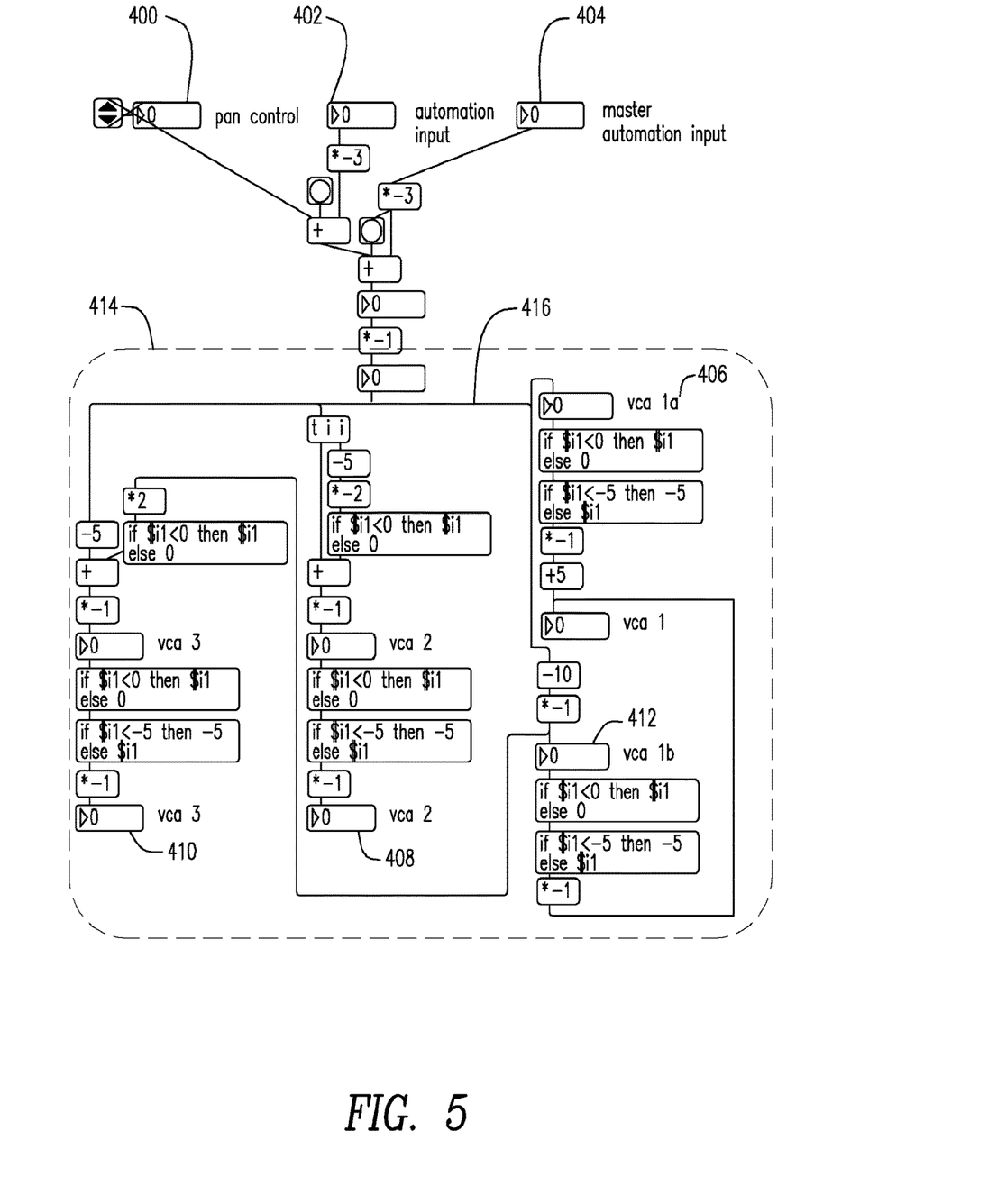
FIG. 5 is a computer code embodiment of a 360° triphonic Pan Control.

FIG. 5 embodies a software representation of a 360° digital triphonic (3 output) pan control created in the Max/MSP visual programming software by Cycling '74. Pan Control (400) behaves the same as Pan Control 120 described above. Automation Input (402) behaves the same as Pan Control Voltage Input 112 described above. Master Automation Input (404) behaves the same as Master Pan Control Voltage (116) described above. Code (414) extracts control signals for VCAs 1a (406), VCA 2 (408), VCA 3 (410), and VCA 1b (412), from Root Pan Control Signal (416), which has a range of 0-15. VCA 1a (406) comes on in the range of 0-5, being completely on at 0 and completely off at 5 and above. VCA 2 (408) comes on in the range of 0-10, being completely off at 0 and from 10-15, and completely on at 5. VCA 3 (410) comes on in the range of 5-15, being completely off from 0-5 and at 15, and completely on at 10. VCA 1b (412) comes on in the range of 10-15, being completely off at 10 and below, and completely on at 15.

The present invention also includes a method of panning among three or more outputs in a digital mixing architecture having one or more channels comprising the steps of:
a) inputting one or more signals into one or more corresponding channels of a digital mixer;
b) for each channel of the digital mixer in which a signal was input, distributing the signal among a plurality of digital voltage controlled amplifiers according to the level of a pan control;
c) receiving each of the signals exiting the digital voltage controlled amplifiers of each channel into a plurality of signal summing stages;
d) combining each of the signals received at each signal summing stage into a single signal corresponding to each signal summing stage; and
e) outputting the signal exiting each of the plurality of signal summing stages.

Figure 6:
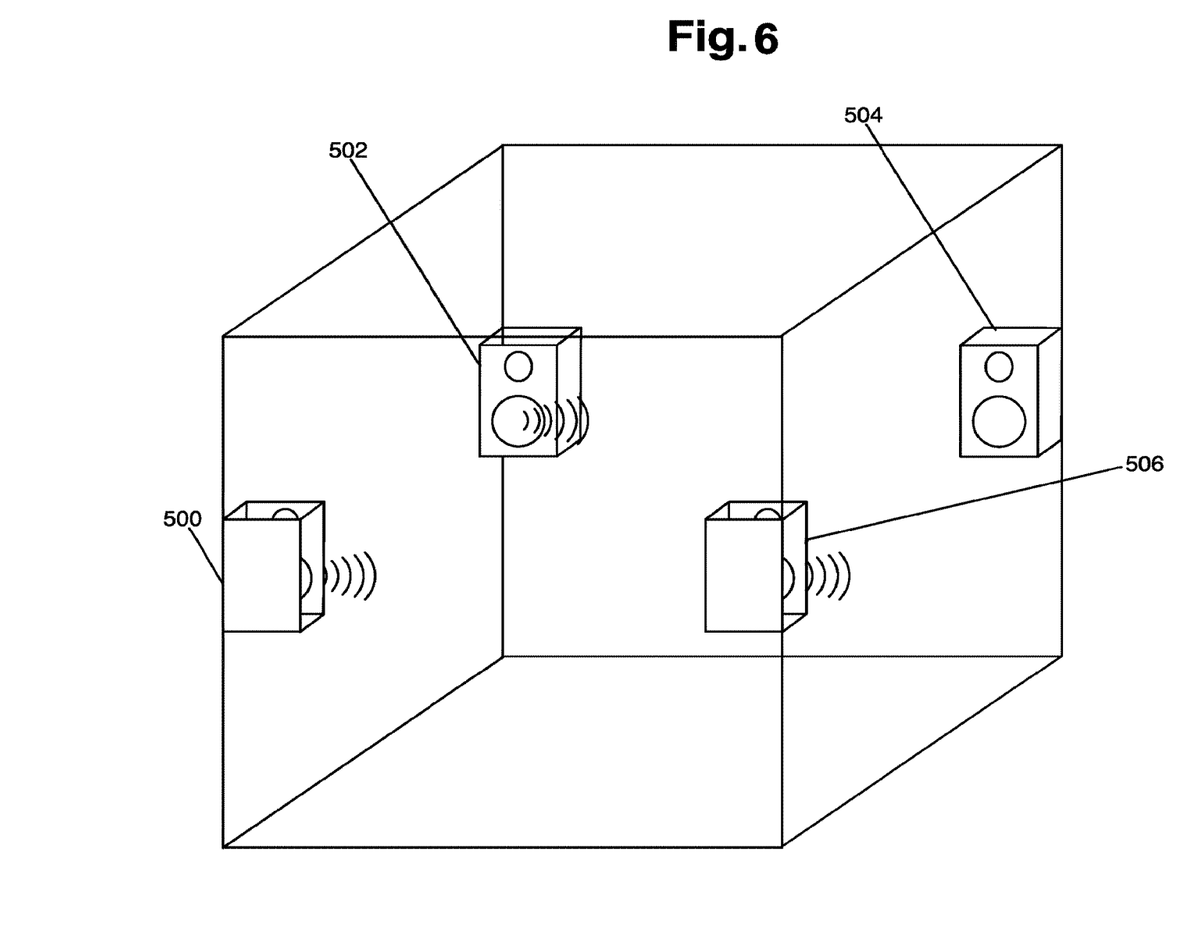
FIG. 6 is a quadraphonic sound field visualization with the Field Control active.

FIG. 6 visualizes a null region panned to the right front speaker (504), which would occur when Field Control (132) is turned up to match the gain of the signal at VCA (106) which then goes through Panner (150). Accordingly there is sound in the left rear (500), left front (502), and right rear (506) speakers while the right front speaker (504) is silent.

Figure 7:
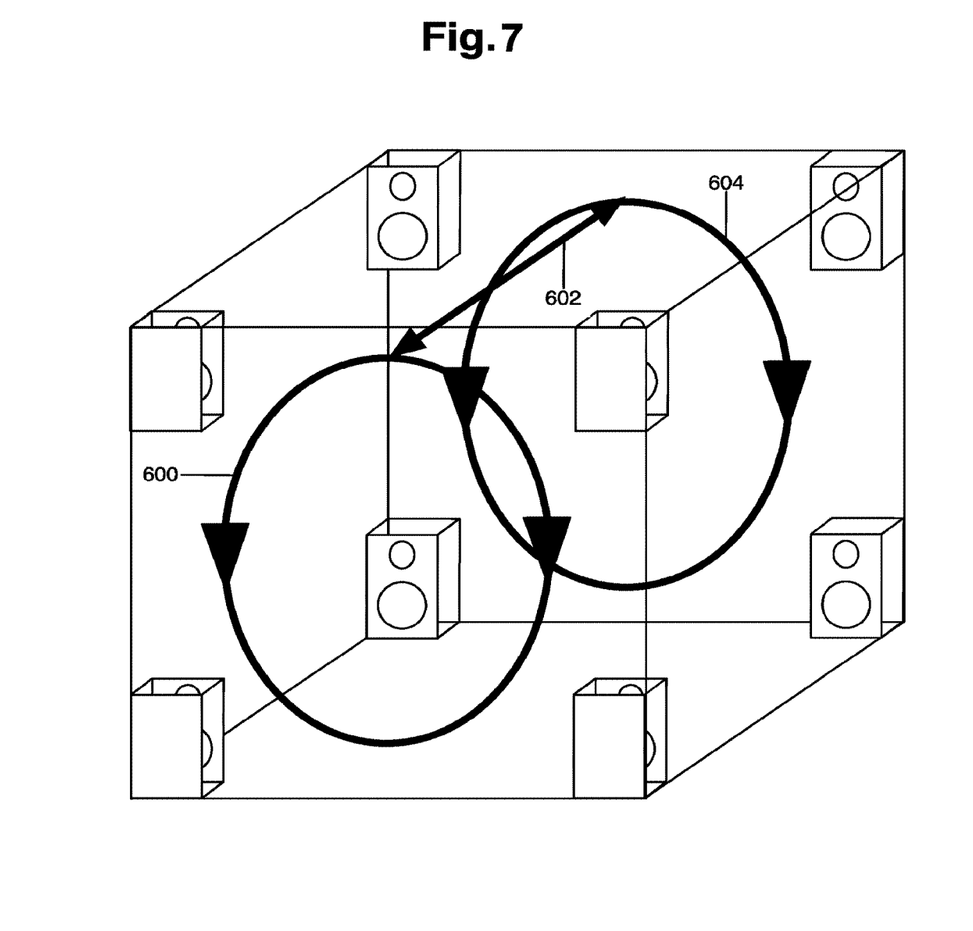
FIG. 7 is a visualization of an 8 output panner configuration.
Figure 8:
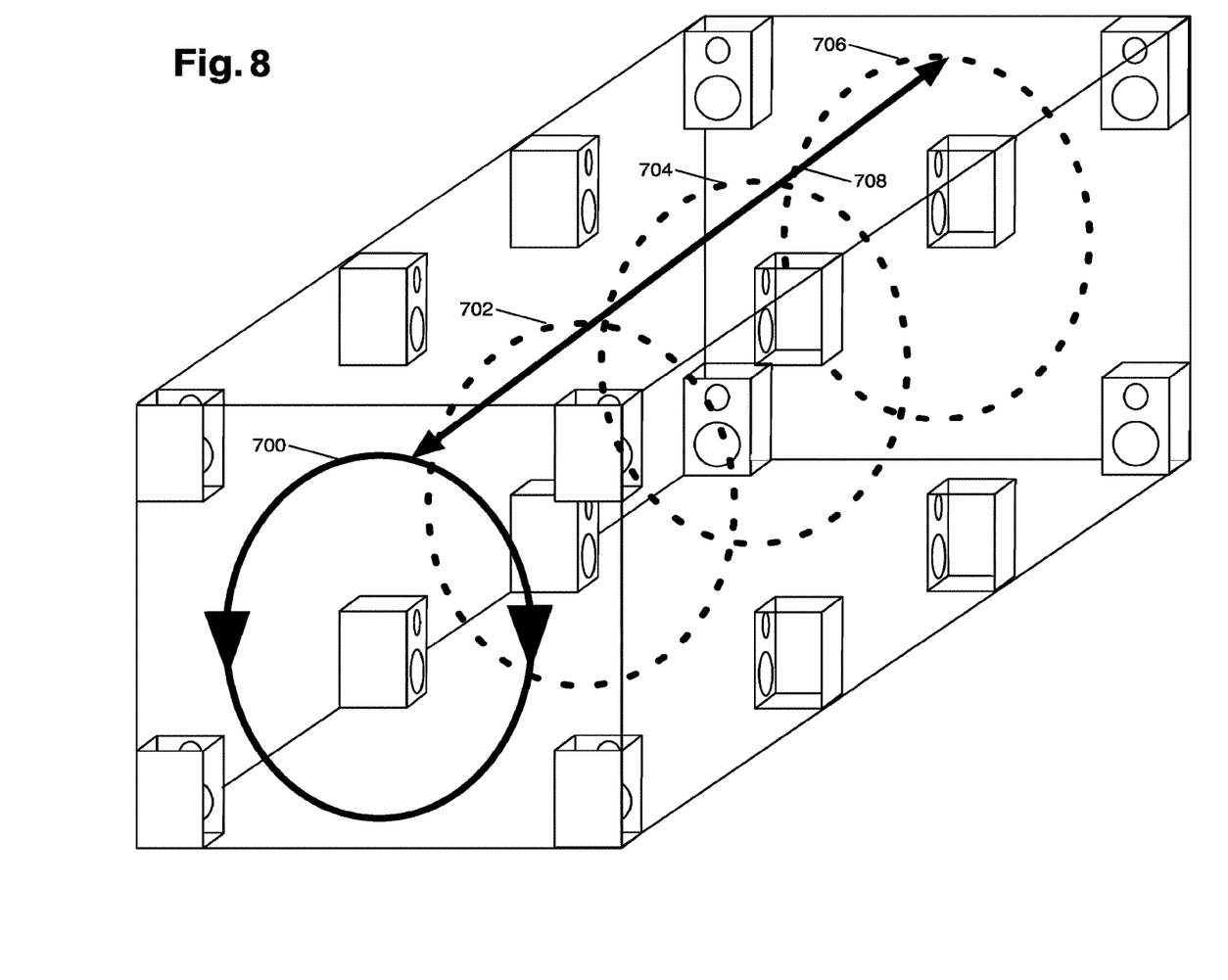
FIG. 8 is a visualization of a 16 output panner configuration.
Figure 9:
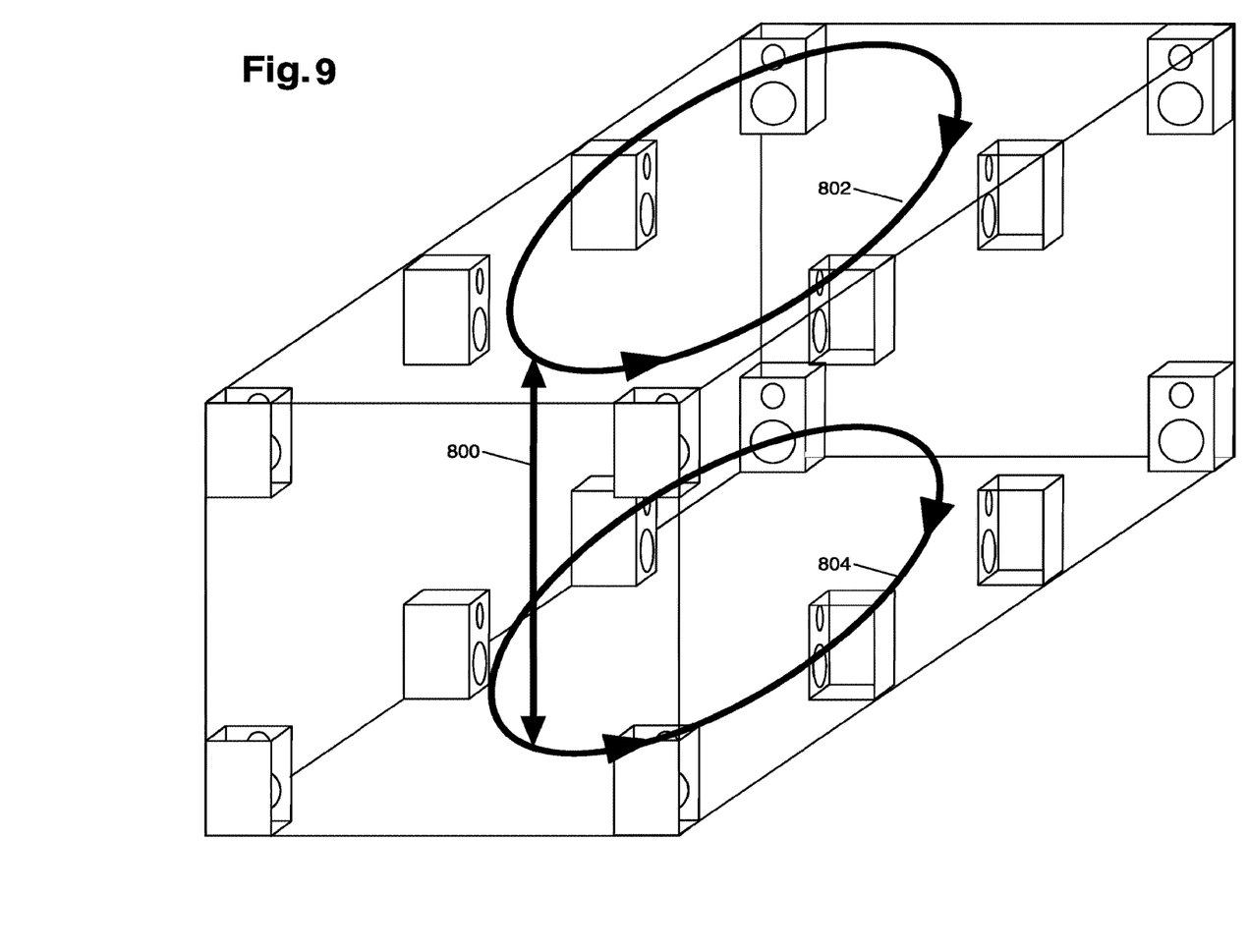
FIG. 9 is a visualization of a 16 output panner configuration.
Figure 10:
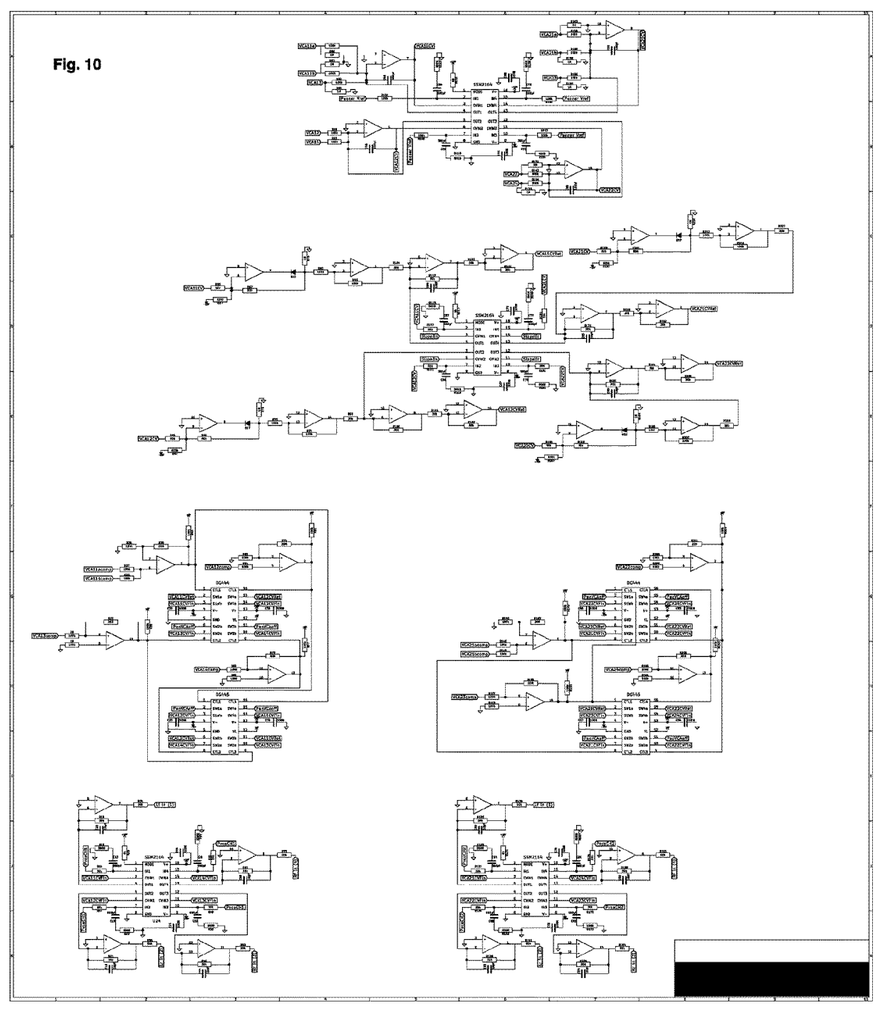
FIG. 10 is a schematic for two partial channels of an analog quadraphonic panning circuit according to the present invention.

FIGS. 7, 8 and 9 serve to show how multiple single-axis panners can be combined to create larger, more complicated configurations.

FIG. 7 is a panner embodiment with an 8 channel speaker arrangement in a 4×2 grid with visualized panning paths. A quadraphonic panner as set forth herein controls the first axis (600, 604) and a standard stereophonic panner, the functioning of which would be well known to a person of ordinary skill in the art, controls the second axis (602).

FIG. 8 is a panner embodiment with a 16 channel speaker arrangement in a 4×4 grid with visualized panning paths. Quadraphonic panners as set forth herein control the first axis (700, 702,704,706), and another quadraphonic panner as set forth herein controls the second axis (708).

FIG. 9 is a panner embodiment with 16 channel speaker arrangement in an 8×2 grid with visualized panning paths. Stereophonic panners control the first axis (800), and an octophonic panner controls the second axis (802, 804).

The embodiments of the invention herein described are merely illustrative of the application of the principles of the invention. Reference herein to details of the illustrated embodiments is not intended to limit the scope of the claims, which themselves recite those features regarded as essential to the invention. This mixing architecture could be used for signals other than audio such as video, control voltage, light, or any transmission where mixing of multiple signals into more than 2 outputs is desirable.

It is envisioned that any feature or element that is positively identified in this description may also be specifically excluded as a feature or element of an embodiment of the present invention as defined in the claims.

The invention described herein may be practiced in the absence of any element or elements, limitation or limitations which is not specifically disclosed herein. Thus, for example, in each instance herein, any of the terms "comprising," "consisting essentially of" and "consisting of" may be replaced with either of the other two terms. The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the claims.

The invention claimed is:

1. A mixing architecture comprising one or more channels and three or more signal outputs, wherein each channel comprises a signal input, one or more pan controls, and a control that outputs a signal inverse to a signal received in the signal input, wherein the inverse signal is distributed equally among the three or more signal outputs, and wherein the signal is distributed among the three or more signal outputs according to a position of the one or more pan controls.

2. The mixing architecture of claim 1 comprising more than one channel.

3. The mixing architecture of claim 1 comprising four signal outputs.

4. The mixing architecture of claim 1 wherein a null region is created in any signal outputs in which the inverse signal and the signal are both distributed.

5. A method of panning among three or more outputs in a mixing architecture having one or more channels comprising the steps of:
   a) inputting one or more signals into one or more corresponding channels of a mixer;
   b) for each channel of the mixer in which one of the signals was input:
      1) receiving the signal into circuitry controlled by a potentiometer having variable resistance;
      2) distributing the signal exiting the circuitry controlled by the potentiometer among a plurality of voltage controlled amplifiers according to the resistance of the potentiometer;
   c) receiving each of the signals exiting the voltage controlled amplifiers of each channel into a plurality of signal summing stages;
   d) combining each of the signals received at each signal summing stage into a single signal corresponding to each signal summing stage; and
   e) outputting the signal exiting each of the plurality of signal summing stages.

6. The method of claim 5 wherein step (a) employs more than one channel.

7. The method of claim 5 wherein the number of outputs is four.

8. The method of claim 5 wherein each signal summing stage corresponds to one of a plurality of signal outputs.

9. The method of claim 5 wherein distribution of the signal among a plurality of voltage controlled amplifiers corresponds to a location in a sound field where sound is desired.

10. A mixing architecture comprising one or more channels and three or more signal output summing stages, wherein each channel comprises a signal input and one or more pan controls, wherein a signal of each channel is distributed among the signal output summing stages according to a position of the pan controls, and wherein the mixing architecture further comprises a master control signal that automates the position of the pan controls of each of the one or more channels prior to the signal being distributed among the signal output summing stages.

11. The mixing architecture of claim 1 wherein the one or more pan controls of each channel is a single-axis pan control.

12. The mixing architecture of claim 11 further comprising a master control signal that automates the position of the single-axis pan control of each of the one or more channels.

13. A method of panning among three or more outputs in a digital mixing architecture having one or more channels comprising the steps of:
   a) inputting one or more signals into one or more corresponding channels of a digital mixer;
   b) for each channel of the digital mixer in which one of the signals was input, distributing the signal among a plurality of digital voltage controlled amplifiers according to the level of a pan control;
   c) receiving each of the signals exiting the digital voltage controlled amplifiers of each channel into a plurality of signal summing stages;
   d) combining each of the signals received at each signal summing stage into a single signal corresponding to each signal summing stage; and
   e) outputting the signal exiting each of the plurality of signal summing stages.

14. The method of claim 13 wherein step (a) employs more than one channel.

15. The method of claim 13 wherein the number of outputs is four.

16. The method of claim 13 wherein each signal summing stage corresponds to one of a plurality of signal outputs.

17. The method of claim 13 wherein distribution of the signal among a plurality of digital voltage controlled amplifiers corresponds to a location in a sound field where sound is desired.

18. The mixing architecture of claim 10 wherein the one or more pan controls of each channel is a single-axis pan control.

* * * * *